United States Patent
Plougmann

(10) Patent No.: US 7,937,934 B2
(45) Date of Patent: May 10, 2011

(54) DOSING PUMP ASSEMBLY

(75) Inventor: Jan Plougmann, Risskov (DK)

(73) Assignee: Grundfos NoNox a/s, Bjerringbro (DK)

( * ) Notice: Subject to any disclaimer, the term of this patent is extended or adjusted under 35 U.S.C. 154(b) by 94 days.

(21) Appl. No.: 12/187,623

(22) Filed: Aug. 7, 2008

(65) Prior Publication Data

US 2009/0038292 A1 Feb. 12, 2009

Related U.S. Application Data

(63) Continuation of application No. 11/165,087, filed on Jun. 23, 2005, now Pat. No. 7,458,204, which is a continuation of application No. PCT/EP03/14664, filed on Dec. 19, 2003.

(30) Foreign Application Priority Data

Dec. 23, 2002 (EP) .................................... 02028889

(51) Int. Cl.
- *F01N 3/00* (2006.01)
- *F01N 3/10* (2006.01)

(52) U.S. Cl. ................. 60/286; 60/274; 60/295; 60/301; 60/303

(58) Field of Classification Search ............... 60/274, 60/286, 295, 301, 303
See application file for complete search history.

(56) References Cited

U.S. PATENT DOCUMENTS

| 4,231,721 | A | * | 11/1980 | Hawk et al. | 417/413.1 |
|---|---|---|---|---|---|
| 5,950,419 | A | * | 9/1999 | Nishimura et al. | 60/274 |
| 6,041,594 | A | * | 3/2000 | Brenner et al. | 60/309 |
| 6,122,909 | A | * | 9/2000 | Murphy et al. | 60/286 |
| 6,209,315 | B1 | | 4/2001 | Weigl | |
| 6,354,079 | B1 | | 3/2002 | Choi et al. | |
| 6,520,753 | B1 | * | 2/2003 | Grosjean et al. | 417/379 |
| 6,823,663 | B2 | | 11/2004 | Hammerle et al. | |
| 6,905,314 | B2 | | 6/2005 | Danby | |
| 6,948,918 | B2 | | 9/2005 | Hansen | |
| 2001/0047794 | A1 | * | 12/2001 | Kato | 123/468 |

FOREIGN PATENT DOCUMENTS

| DE | 10127834 A | 12/2002 |
|---|---|---|
| EP | 1149991 A | 10/2001 |
| WO | 02/25074 A1 | 3/2002 |

* cited by examiner

*Primary Examiner* — Thomas E Denion
*Assistant Examiner* — Michael Carton
(74) *Attorney, Agent, or Firm* — Panitch Schwarze Belisario & Nadel LLP

(57) ABSTRACT

A metering pump assembly for admixing a fluid reduction agent from a supply container and a pressurized air flow into an exhaust gas flow of a combustion engine includes an assembly housing and a pre-mixer at least partially within the housing. A membrane pump within the housing is fluidly connected between the supply container and the pre-mixer. An electric motor generates a rotational output. A transmission converts the rotational output of the electric motor into translatory movement. The translatory movement drives the membrane pump to pump the reduction agent from the supply container into the pre-mixer. The pressurized air flow is in fluid communication with the pre-mixer and mixes with the reduction agent within the pre-mixer to form a reduction agent air mixture. An exit conduit fluidly connects the pre-mixer to the exhaust gas flow. The reduction air mixture is delivered through the exit conduit and into the exhaust gas flow.

13 Claims, 3 Drawing Sheets

US 7,937,934 B2

DOSING PUMP ASSEMBLY

CROSS-REFERENCE TO RELATED APPLICATIONS

This application is a continuation of U.S. patent application Ser. No. 11/165,087 filed Jun. 23, 2005 which is a continuation of International Application No. PCT/EP2003/014664, filed Dec. 19, 2003, which was published in the German language on Jul. 15, 2004, under International Publication No. WO 2004/059164 A1 and the disclosure of which is incorporated herein by reference.

BACKGROUND OF THE INVENTION

The invention relates to a metering pump assembly for admixing a fluid reduction agent to an exhaust gas flow, with an assembly housing which accommodates an electrical drive, a transmission, a membrane pump, and control and regulation electronics With auto-ignition internal combustion engines, on operation with an excess of oxygen, which is the case in the majority of operating conditions, nitrogen oxides arise, and specifically for example with direct injection into the main combustion space, as is typically the case with diesel motors. It is known to lead the exhaust gas flow to a reduction catalyser in order to reduce these environmentally harmful $NO_x$ emissions. An aqueous urea solution as a reduction agent is led to the exhaust gas in a finely distributed manner before entry into the catalyser. At the same time the quantity of fed urea is to be matched as exactly as possible to the combustion process, in order to ensure as complete a reduction as possible within the catalyser and on the other hand to avoid an excess of urea. For this purpose, separate control and regulation (closed-loop control) electronics are required which control the supply of urea in dependence on the variables which are characteristic of the combustion and reduction process (temperature upstream and downstream of the catalyser, the air volume led to the combustion process, $NO_x$ and $O_2$ content of the exhaust gas).

It is known from German published patent application DE 44 36 397 A1 to apply a metering valve in order to supply the aqueous urea solution in the quantity which is required at just this respective moment. At the same time, the delivery of the urea solution is effected by way of the application of pressure to a supply tank with pressurized air, which in turn also serves for entraining the urea solution into the exhaust gas flow.

The setting of the urea supply container under pressure, in combination with a metering valve directly in front of the injection location, has disadvantages which are inherent to the system. In this respect, that which is more favorable is the application of a metering pump which suctions the aqueous urea solution from an essentially pressure-free supply container and leads this in a targeted manner to a pressurized gas, in particular to a pressurized air flow which is led then via a nozzle to the exhaust gas flow in a finely distributed manner directly upstream of the catalyser. Such an arrangement is particularly preferred for a mobile application in motor vehicles, and is known for example from U.S. Pat. No. 5,842,341.

Metering pumps are applied in many technical fields, but are usually stationary. Such a metering pump manufactured and marketed by the company Grundfos, Denmark is known under the type descriptions DME and DMS. These pumps are designed and conceived for stationary application and are therefore suitable only to a limited extent for the application purpose being discussed here.

BRIEF SUMMARY OF THE INVENTION

Against this state of the art, it is the object of the present invention to provide a metering pump assembly which is specially designed for admixing a fluid reduction agent into an exhaust gas flow, in particular of a motor vehicle.

According to the invention, the metering pump assembly described at the outset has an assembly housing comprising at least parts of a pre-mixer in which the fluid reduction agent is subjected to a pressurized gas flow. Advantageous embodiments of the invention are described in the following description and the drawings.

The basic concept of the present invention is the provision of the metering pump assembly with further components for this special application purpose, which are usefully to be arranged in the assembly housing. At the same time, depending on the design, only parts of the pre-mixer or this too may be arranged completely in the assembly housing, including the auxiliary assemblies required for this. This is particularly advantageous for application in vehicles, where the assembly of individual components is to be avoided whenever possible, since on the one hand the components should be encapsulated from the harsh influences of the environment, on the other hand the components should be mounted with low oscillation, and finally restriction or removal of installation space for other assemblies should be allowed.

The pre-mixer which, according to the invention, is arranged at least in parts within the assembly housing serves first for subjecting the liquid reduction agent (generally an aqueous urea solution, for example a 30% urea solution) to a pressurized air flow in order then to feed this pre-mixed mass flow to the exhaust gas flow in a manner such that it is distributed as finely as possible by way of a nozzle arranged in the exhaust gas flow directly upstream of the catalyser. At the same time, the metering pump ensures that only just that quantity of urea solution is fed which is required for the reduction of the nitrogen oxides.

Since urea which is maintained in aqueous solution, on contact with air, thus in particular also pressurized air, may at least partly crystallise out, which may lead to sticking, restrictions and blockages in the conduit system, according to a further formation of the invention means for blowing out the conduit parts coming into contact with the fluid reduction agent as well as with the pressurized gas flow are provided, thus at least for the conduit parts which lie downstream of the location at which the two flows meet.

In order to render this possible, a first valve is arranged within the assembly housing, which in a first switch position connects a conduit leading the pressurized air flow to a conduit leading to the exhaust gas flow for the purpose of blowing out this conduit, and in a second switch position connects the exit conduit of the pump to the conduit leading to the exhaust gas flow, thus forms the normal operational position. Thus, without further technical accessories and while using pressurized air which is available in any case, one may achieve a blowing-out of the corresponding conduit parts by way of a suitable activation of this first valve, in order to protect to a large extent these conduit parts from urea deposits.

On the other hand, before operation of the pre-mixer it is to be ensured that the conduit system, in particular from the exit of the pump up to the mixing location, is completely filled with fluid reduction agent, since only then does the admixed quantity of reduction agent correspond to the quantity delivered by the metering pump. For this purpose, according to the invention, means are provided for flushing and/or bleeding the conduits leading the reduction agent, and specifically within the assembly housing. In this connection, a second valve—hereinafter called pre-flushing valve—is arranged within the assembly housing, by which the exit conduit of the pump may be selectively connected to a conduit, which leads to the tank for the reduction agent, or to a conduit leading to the first valve or to the exhaust gas flow. The latter position is the operational position. For the starting operation of the pre-mixer, the pre-flushing valve is controlled into the first-mentioned position and the metering pump is switched to permanent operation, so that the conduit is continuously flushed with liquid reduction agent, which then flows back into the supply container. On account of this, one reliably ensures that the conduits leading the reduction agent are completely filled with the agent.

Usefully, the assembly housing is constructed of several parts which are functionally separated from one another, and specifically in a manner such that one housing part is provided for the electronics, another housing part for the drive motor and the drive mechanics, and a further housing part for the components leading the fluid, such as conduits, conduit connections, valves and membrane pump. At the same time, the drive mechanics are preferably arranged in the middle housing part, and the electronics to one side and the fluid-leading components to the other side of this middle housing part. Such an arrangement not only encourages the operational reliability of the assembly, but is also advantageous in the case of repairs since, for example, exiting reduction agent may not come into contact with mechanical or electronic components.

It is to be understood that the valves are usefully arranged in the fluid-leading part of the pump housing, just as the conduit connections, thus preferably also the connection for a pressurized air supply conduit for the supply of the assembly with pressurized air.

Since the pressurized air conduit, particularly with vehicles, is usually under operating pressure, on the assembly side it is useful to provide a shut-off valve for the conduit leading pressurized air, in order to be able to shut off the supply of pressurized air when required.

In order to prevent fluid reduction agent from penetrating into the pressurized air conduit, for example in the case of a pressure drop, and this becoming possibly restricted due to the crystallisation of the urea, a return valve is usefully provided in the conduit leading the pressurized air, and specifically downstream of the shut-off valve in the through-flow direction. This return valve usefully likewise lies within the assembly housing, and specifically in the housing part for the fluid-leading parts.

In order to be able to exchange the complete assembly in a quick and simple manner for repair or maintenance purposes, it is useful to provide in each case a conduit connection on the assembly housing for all conduits leading fluid, the connection being envisaged for the releasable connection to a corresponding connection conduit. This, in a simple form, may be formed by a connection spout (union) onto which a flexible tubing may be pushed, but also by flexible tubing coupling systems. Since, preferably, digital control and regulation electronics are present in any case within the assembly housing of the metering pump assembly, it is useful to also arrange the control and/or regulation electronics within the assembly housing, these electronics being necessary for the reduction process and the valve-control.

According to the invention, the assembly housing may also encompass parts of the pre-mixer. Thus the actual mixing procedure between the conduit leading the reduction agent and the conduit leading the pressurized air may take place outside the assembly housing, if this is advantageous. According to a preferred formation of the invention, however, the assembly housing does not comprise the complete pre-mixer. This is not only favorable with regard to design, but also with regard to extreme operating conditions, such as at low temperatures as regularly occur in the operation of motor vehicles. One may then ensure the operational reliability of the complete pre-mixer by way of provisions on the part of the assembly housing, without having to make further provisions on the part of the vehicle.

In order to be able to apply the metering pump assembly in vehicles which realize the control and/or regulation electronics for the reduction process and the valve control by way of the digital motor electronics, as well as in those with which such control and/or regulation electronics are not provided, it is useful to provide the regulation (closed-loop control) electronics or at least parts of the regulation electronics as a housing module, which is preferably releasably attached, so that the metering pump assembly may be applied with or without such a module depending on the application purpose.

Briefly stated, the present invention is directed to a metering pump assembly for admixing a fluid reduction agent from a supply container and a pressurized air flow into an exhaust gas flow of a combustion engine and includes an assembly housing for mounting proximate to the exhaust gas flow. A pre-mixer has at least a portion thereof within the assembly housing. A membrane pump is within the assembly housing and is fluidly connected between the supply container and the pre-mixer. An electric motor is within the assembly housing and generates a rotational output. A transmission converts the rotational output of the electric motor into translatory movement. The translatory movement drives the membrane pump to pump the reduction agent from the supply container into the pre-mixer. The pressurized air flow is in fluid communication with the pre-mixer and mixes with the reduction agent within the pre-mixer to form a reduction agent air mixture. An exit conduit fluidly connects the pre-mixer to the exhaust gas flow. The reduction air mixture is delivered through the exit conduit and into the exhaust gas flow.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
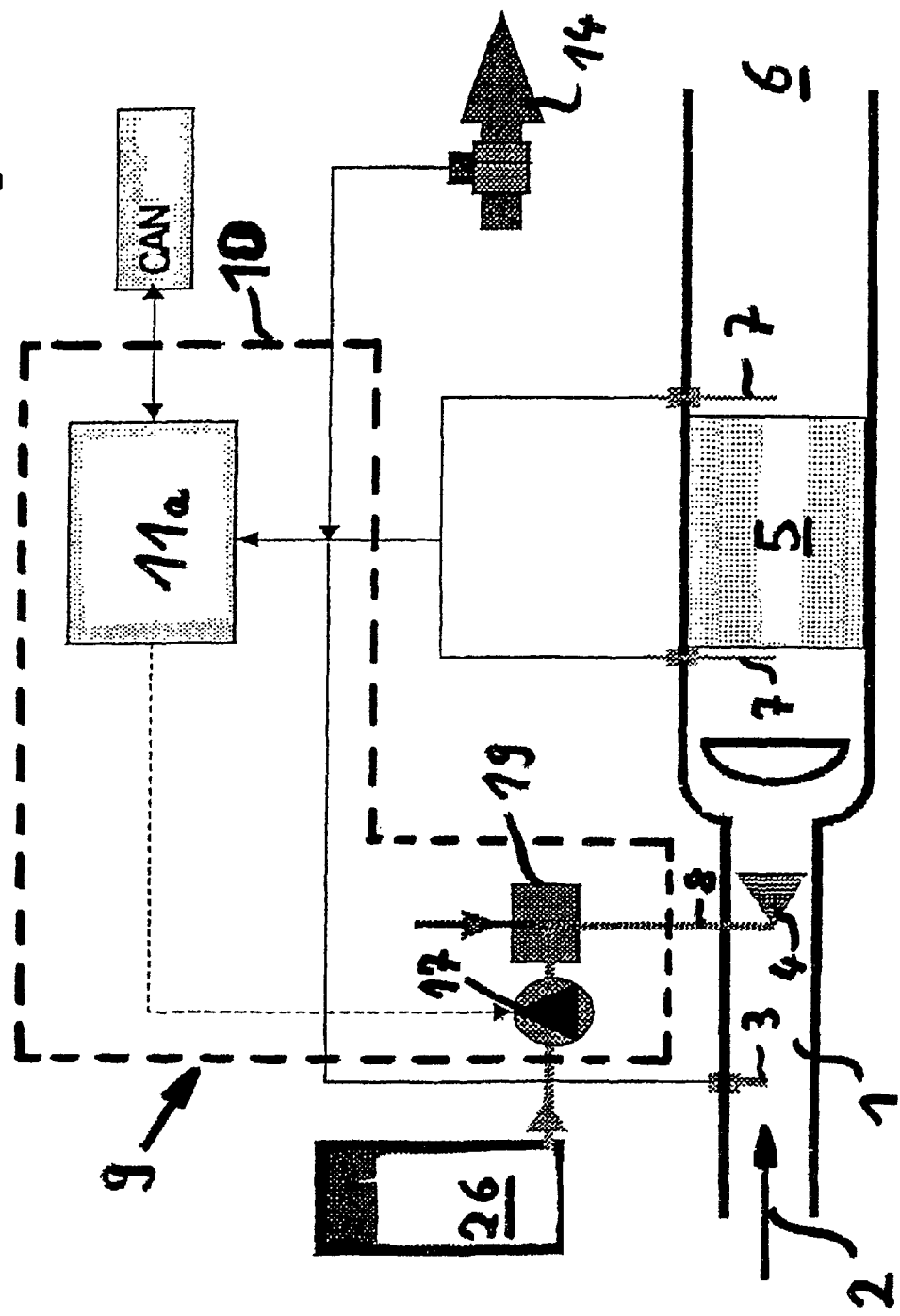
FIG. 1 is a schematic block diagram illustrating the pre-mixer with its auxiliary assemblies, the exhaust gas conduit system and the reduction catalyser, according to an embodiment of the invention.

The exhaust gas conduit 1 of a diesel motor is shown in FIG. 1, whose through-flow direction is indicated at 2. The warm exhaust gas coming from the combustion engine flows through the conduit 1 first past a sensor 3, which detects the nitrogen oxide content and the oxygen content. In the through-flow direction, a nozzle head 4 lies downstream of this, via which a flow comprising pressurized air and fluid reduction agent in the form of aqueous urea is led to the exhaust gas flow 2 in a finely distributed manner. A reduction catalyser 5, after whose exit the exhaust gas leaves the system through the free end 6 of the conduit, connects directly downstream of this. In the flow direction, temperature sensors 7 are provided in each case upstream and downstream of the catalyser 5.

Figure 2:
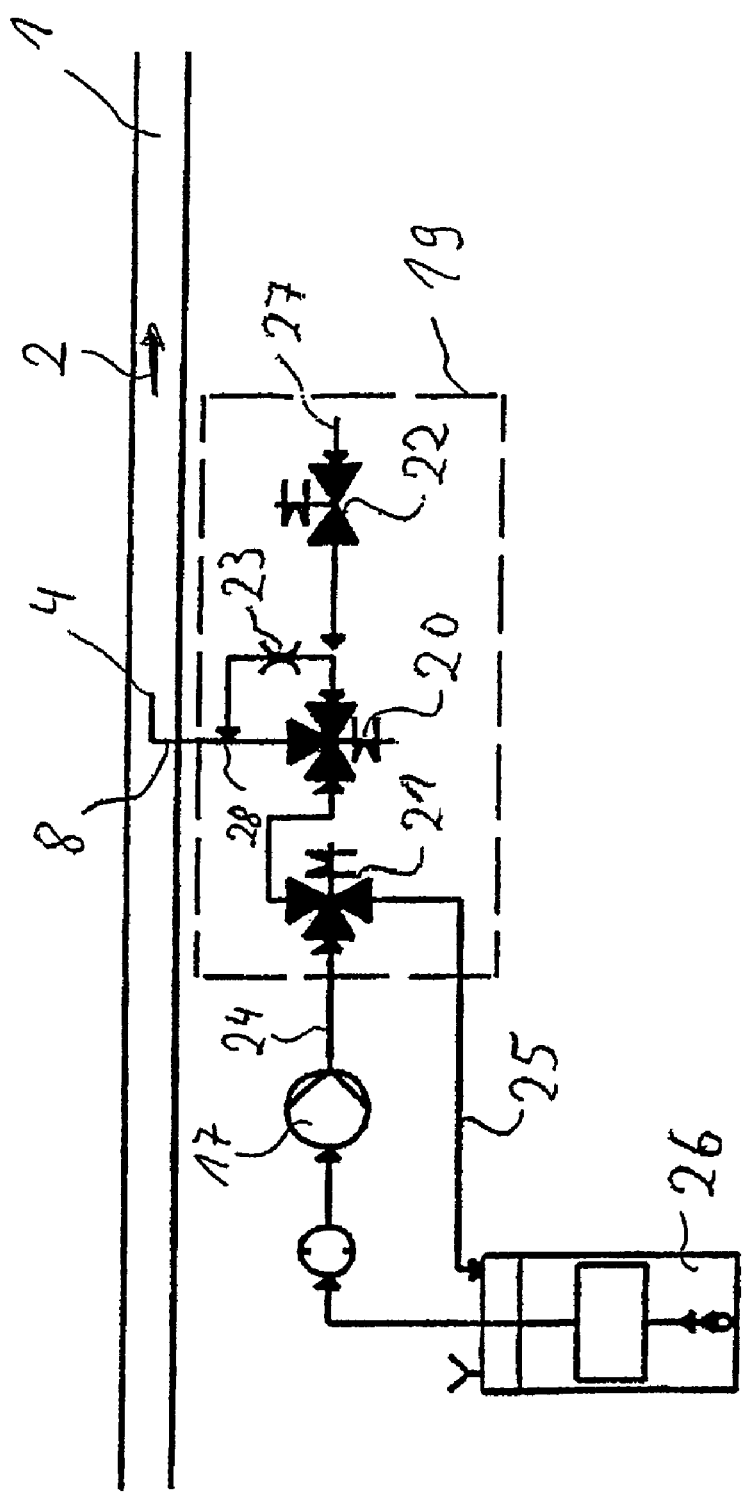
FIG. 2 is a block diagram of the pre-mixer of the metering pump assembly according to an embodiment of the invention.
Figure 3:
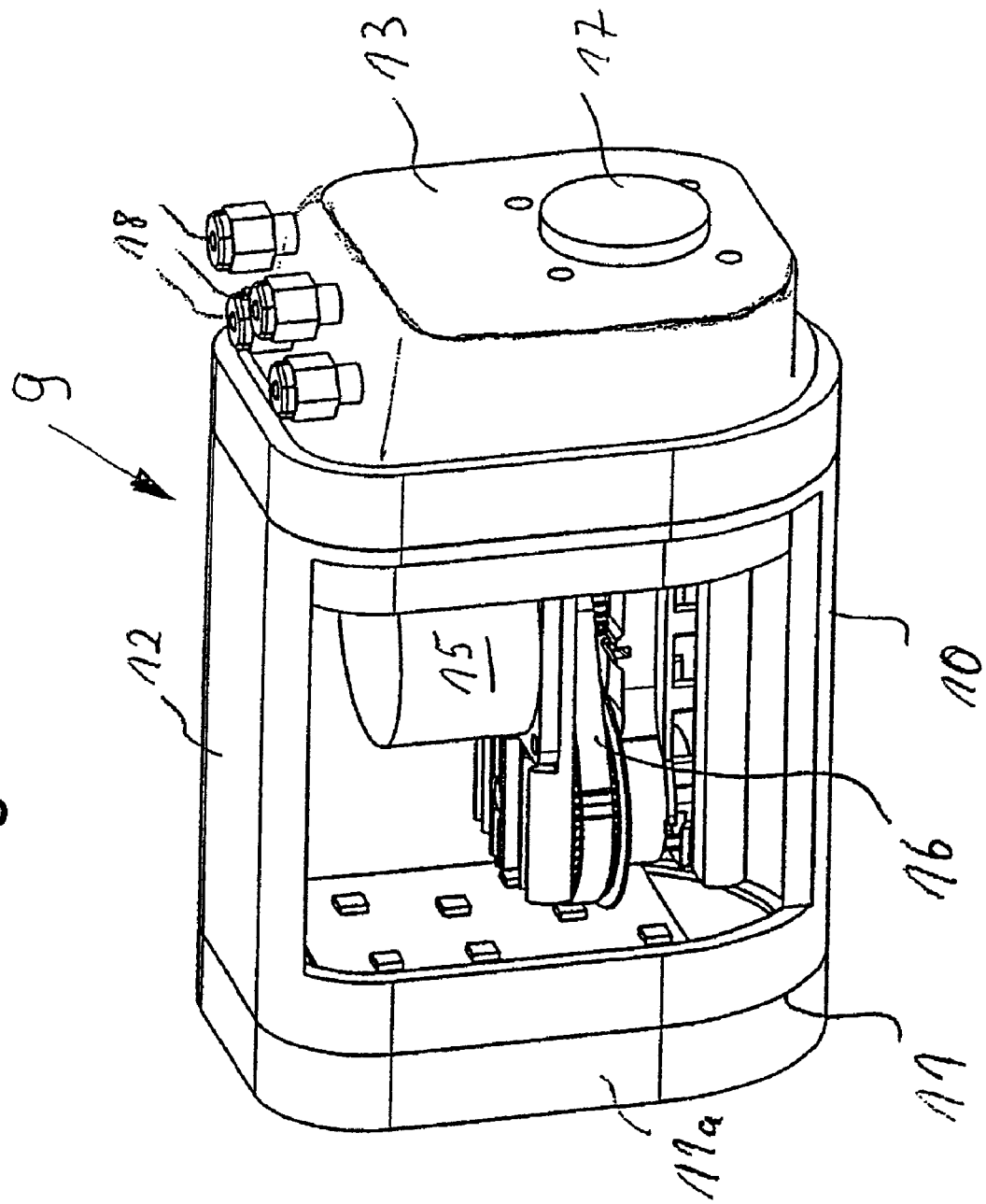
FIG. 3 is a metering pump assembly according to the invention in a simplified, partly sectioned, perspective view.

The nozzle head 4 is supplied by a conduit 8 which comes from a metering pump assembly 9, as is shown by way of FIGS. 2 and 3. The metering pump assembly 9 comprises an assembly housing 10, which is divided into essentially three regions 11, 12, and 13. The housing part 11, which connects to an end-face of the housing 10 on the one hand, comprises the control and regulation electronics for the metering pump as well as furthermore the control and regulation electronics for the reduction process. These control and regulation electronics may be connected to the motor electronics via a CAN-bus and furthermore detect the signals of the temperature sensors 7, the sensor 3 and the air mass flow led to the combustion procedure which is symbolised in FIG. 1 by the arrow 14.

A housing part 12 connects to the housing part 11 for the electronics, and this housing part 12 comprises the drive motor in the form of a stepper motor 15, as well as an eccentric gear 16 which steps down the rotational movement of the motor 15 and converts this into a translatory movement, which drives the actual membrane pump 17, which is seated in a housing part 13 connecting to the housing part 12 and comprising all fluid-leading parts of the assembly. The housing part 13 is separated from the housing part 12 by way of an intermediate wall (not shown) so that in the case of an inadvertent escape of fluid, be it on repair or with a leakage, it is ensured that the fluid may not penetrate into the housing parts 11 and 12.

The housing part 11 is designed in a divided manner and comprises a part which is integrally formed with the remaining housing 10 and which comprises the control and regulation electronics for the motor 5, as well as a removable housing 11a, which connects thereto at the end-face and which comprises the electronics required for the control and regulation of the reduction process. In this manner, the assembly may be applied selectively with or also without these control and regulation electronics for the reduction process. The housing part 11a is designed in a modular manner and is connected electrically to the remaining electronics by way of plug-and-socket connections, and is also releasably connected to the housing part 11 in a mechanical manner. The actual membrane pump 17 with the associated return valves is located within the housing part 13. Furthermore, four connections 18 are provided on the housing part 12 to which conduits are releasably connected and which are shown in detail in FIG. 2.

The membrane pump 17 as well as a pre-mixer 19 is arranged in the housing part 13. The pre-mixer 19 comprises a first 3/2-way valve 20, a second 3/2-way valve as a pre-flushing valve and a shut-off valve 22, as well as a throttle location 23.

The functions and the conduit connections and the valves operate as follows.

Before the start of the operation of the pump assembly, with the pre-mixer 19 it must be ensured that the conduit 24 on the pump exit side is filled with fluid reduction agent. For this purpose, the pre-flushing valve 21 is activated in a manner such that the conduit 24 on the pump exit side is connected to a return conduit 25, which conveys the fluid reduction agent back into a supply container 26. The reduction agent is suctioned and delivered towards the pump 17 from the supply container 26.

After the flushing has been effected and it is thus ensured that the conduit 24 leads the liquid in a complete manner, the pre-flushing valve 21 is changed over, by which the conduit 24 on the pump exit side is connected to the entry of the valve 20, which in the operational position is connected such that a conduit connection to the conduit 8 exists which feeds the nozzle head 4. Reduction agent gets into the conduit 8 via this conduit lead. Pressurized air, which is supplied via a connection 18 and a conduit 27, goes through the opened shut-off valve 22 to the throttle location 23 and from here via the mixing location 28 into the conduit 8, so that with a suitable delivery of the pump 17 and impinging of the conduit 27 with pressurized air, the desired pre-mixing is effected and is led via the conduit 8 (likewise via connection 18) out of the assembly housing.

The metering of the reduction agent is effected in a manner known per se, dependent on operation, with the help of control and regulation electronics. On completing the operation, thus for example when the internal combustion engine has been switched off, the valve 20 is re-routed in a manner such that the conduit 27 leading pressurized air while bypassing the throttle location 23 is directly connected to the conduit 8. In this manner, the part of conduits leading the reduction agent which lies on the other side of the valve 20, thus also the part which lies on the other side of the mixing location 28 is supplied with pressurized air, by which the reduction agent remaining in the conduit is blown out via the nozzle 4, and thus the conduit system itself may not become contaminated by urea which crystallises out.

The four connections 18 of the housing part 13 are thus connections for the suction conduit 29 of the pump 17, for the return conduit 25 to the supply container 26, for the supply of pressurized air to the conduit 27, and for the conduit 8.

The electrical and sensor connections are provided on the housing part 11. The assembly housing is designed in a compact manner and hermetically sealed, so that it may be installed at any location in the motor space. The assembly is electrically designed for supply from the vehicle's own electricity supply, for example 12 volts or 42 volts. The supply container 26 for the reduction agent is non-pressurized and may therefore be arranged at any location in the vehicle, and no special provisions are required, as is the case with pressurized containers. The pressurized air which is required for operation of the pre-mixer may be taken from the vehicles own pressurized air supply or may be provided by way of a separate compressor.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A metering pump assembly for admixing a fluid reduction agent from a supply container and a pressurized air flow into an exhaust gas flow of a combustion engine, the metering pump assembly comprising:

an assembly housing for mounting proximate to the exhaust gas flow, the assembly housing being divided into a first housing part, a second housing part and a third housing part, each housing part defining a cavity, the second housing part being connected to both the first and third housing parts, the first housing part includes control and regulation electronics at least partially enclosed by the cavity thereof;

a pre-mixer having at least a portion thereof within the assembly housing;

a membrane pump at least partially enclosed by the cavity of the third housing part of the assembly housing and fluidly connected between the supply container and the pre-mixer by a conduit, a return conduit fluidly connected between a pre-flushing valve within the pre-mixer and the supply container;

an electric motor at least partially enclosed by the cavity of the second housing part of the assembly housing generating a rotational output;

a transmission at least partially enclosed by the cavity of the second housing part of the assembly housing converting the rotational output of the electric motor into translatory movement, the translatory movement driving the membrane pump to pump the reduction agent from the supply container into the pre-mixer, the pressurized air flow being in fluid communication with the pre-mixer and mixing with the reduction agent within the pre-mixer to form a reduction agent air mixture; and an exit conduit fluidly connecting the pre-mixer to the exhaust gas flow, the reduction air mixture being delivered through the exit conduit and into the exhaust gas flow.

2. The metering pump assembly according to claim 1, wherein the assembly housing includes a connection for a pressurized air supply conduit.

3. The metering pump assembly according to claim 2, wherein the assembly housing includes a return valve downstream of the membrane pump.

4. The metering pump assembly according to claim 2, wherein the assembly housing includes a throttle upstream of a location at which the reduction agent is subjected to the pressurized air flow such that the throttle controls the delivery of the reduction agent air mixture to the exhaust air flow.

5. The metering pump assembly according to claim 1, wherein the assembly housing further includes a valve control to control the pre-mixer.

6. The metering pump assembly according to claim 5, wherein at least parts of the control and the regulation electronics are located within a housing module releasably attached to the assembly housing.

7. The metering pump assembly according to claim 6, wherein the parts of the control and regulation electronics form a closed-loop control system.

8. The metering pump assembly according to claim 1, wherein means are provided for blowing out the exit conduit.

9. The metering pump assembly according to claim 1, further including a first valve within the assembly housing, the first valve in a first switched position fluidly connecting the pressurized air flow to the exit conduit and the first valve in a second switched position connecting the membrane pump to the exit conduit.

10. The metering pump assembly according to claim 1, wherein the return conduit fluidly connects the membrane pump downstream of the membrane pump back to the supply container.

11. The metering pump assembly according to claim 1, wherein the assembly housing includes a releasable conduit connection for each fluid-leading conduit leading into or out of the assembly housing.

12. The metering pump assembly according to claim 1, wherein the pre-mixer is entirely within the assembly housing.

13. The metering pump assembly according to claim 1, wherein the exit conduit includes a nozzle positioned within the exhaust air flow, the nozzle spraying the reduction agent air mixture into the exhaust air flow.

* * * * *